US012698387B2

(12) United States Patent
An et al.

(10) Patent No.: US 12,698,387 B2
(45) Date of Patent: Aug. 4, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Yong Hee An, Daejeon (KR); Chun Ho Park, Daejeon (KR); Jeongmin Jang, Daejeon (KR); Tae Hoon Kim, Daejeon (KR); Daeun Sung, Daejeon (KR); Wangrae Joe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 925 days.

(21) Appl. No.: 17/793,527

(22) PCT Filed: Dec. 14, 2021

(86) PCT No.: PCT/KR2021/019010
§ 371 (c)(1),
(2) Date: Jul. 18, 2022

(87) PCT Pub. No.: WO2022/158720
PCT Pub. Date: Jul. 28, 2022

(65) Prior Publication Data
US 2023/0235161 A1     Jul. 27, 2023

(30) Foreign Application Priority Data
Jan. 22, 2021     (KR) ........................ 10-2021-0009292

(51) Int. Cl.
| | |
|---|---|
| *C08L 51/00* | (2006.01) |
| *C08F 212/08* | (2006.01) |
| *C08F 220/14* | (2006.01) |
| *C08F 220/44* | (2006.01) |

(52) U.S. Cl.
CPC .......... *C08L 51/003* (2013.01); *C08F 212/08* (2013.01); *C08F 220/14* (2013.01); *C08F 220/44* (2013.01); *C08L 2201/10* (2013.01); *C08L 2203/30* (2013.01); *C08L 2205/025* (2013.01)

(58) Field of Classification Search
CPC .......... C08L 33/10; C08L 33/12; C08L 51/00; C08L 51/04; C08L 51/003; C08L 2207/53
See application file for complete search history.

(56) References Cited

U.S. PATENT DOCUMENTS

| | | | |
|---|---|---|---|
| 4,885,335 A | 12/1989 | Gallucci et al. | |
| 5,039,747 A * | 8/1991 | Piejko | C08L 25/16 |
| | | | 525/197 |
| 5,112,910 A * | 5/1992 | Piejko | C08L 33/06 |
| | | | 525/228 |
| 9,365,671 B2 | 6/2016 | Kim et al. | |
| 10,882,992 B2 | 1/2021 | Ueda et al. | |
| 2007/0178325 A1 | 8/2007 | Edgecombe et al. | |

| | | | |
|---|---|---|---|
| 2009/0043038 A1 | 2/2009 | Rogunova et al. | |
| 2012/0128940 A1 | 5/2012 | Kamiyama | |
| 2016/0002455 A1 | 1/2016 | Chung et al. | |
| 2016/0333178 A1 | 11/2016 | Shimozawa et al. | |
| 2016/0340505 A1 | 11/2016 | Kim et al. | |
| 2018/0171131 A1 | 6/2018 | Park et al. | |
| 2019/0023892 A1 | 1/2019 | Kang et al. | |
| 2019/0023893 A1 | 1/2019 | Park et al. | |
| 2019/0382574 A1 * | 12/2019 | An | C08L 33/062 |
| 2020/0216653 A1 * | 7/2020 | Kang | C08L 25/12 |
| 2021/0108070 A1 | 4/2021 | Park et al. | |
| 2021/0214544 A1 | 7/2021 | Park et al. | |
| 2021/0277220 A1 | 9/2021 | Kim et al. | |
| 2022/0356340 A1 | 11/2022 | Park et al. | |

FOREIGN PATENT DOCUMENTS

| | | |
|---|---|---|
| CN | 108473748 A | 8/2018 |
| CN | 108699315 A | 10/2018 |
| CN | 114514282 A | 5/2022 |
| EP | 3623421 A1 | 3/2020 |
| EP | 4 019 587 A1 | 6/2022 |
| JP | H0733470 B2 | 4/1995 |

(Continued)

OTHER PUBLICATIONS

First Office Action issued in corresponding Japanese Patent Application No. 2022-539255, dated May 29, 2023.
Extended European Search Report issued in corresponding European patent application No. 21916636.0, dated Jul. 3, 2023.
International Search Report and Written Opinion issued in corresponding International Patent Application No. PCT/KR2021/019010, dated Mar. 24, 2022.
Office Action issued Dec. 28, 2023 for counterpart Chinese Patent Application No. 202180009660.4 Note: US 2016/0002455 A1 and JP 2006-56961 A were cited in a prior IDS.

(Continued)

*Primary Examiner* — Jeffrey S Lenihan
(74) *Attorney, Agent, or Firm* — Morgan, Lewis & Bockius LLP

(57) ABSTRACT

The present disclosure relates to a thermoplastic resin composition, a method of preparing the same, and a molded article including the same. For example, the present disclosure relates to a thermoplastic resin composition including 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B). The thermoplastic resin composition has an alkyl acrylate coverage value (X) of 70% or more as calculated by Equation 1. The thermoplastic resin composition may have beneficial mechanical properties, such as impact strength, tensile strength, and flexural strength, surface hardness, transparency, and colorability and may be capable of preventing occurrence of whitening during bending due to beneficial non-whitening properties.

11 Claims, 1 Drawing Sheet

(56)          References Cited

FOREIGN PATENT DOCUMENTS

| | | | |
|---|---|---|---|
| JP | 2006056961 | A | 3/2006 |
| JP | 2009255555 | A | 11/2009 |
| KR | 10-2009-0073702 | A | 7/2009 |
| KR | 10-2012-0050932 | A | 5/2012 |
| KR | 10-2013-0066114 | A | 6/2013 |
| KR | 10-2014-0005510 | A | 1/2014 |
| KR | 10-2016-0061265 | A | 5/2016 |
| KR | 10-2016-0119053 | A | 10/2016 |
| KR | 10-2016-0130995 | A | 11/2016 |
| KR | 10-2018-0036248 | A | 4/2018 |
| KR | 10-2018-0071835 | A | 6/2018 |
| KR | 10-2019-0073323 | A | 6/2019 |
| KR | 10-2020-0055662 | A | 5/2020 |
| KR | 10-2020-0055675 | A | 5/2020 |
| TW | 200732395 | A | 9/2007 |
| TW | I455997 | B | 10/2014 |

OTHER PUBLICATIONS

Office Action dated Feb. 18, 2025 corresponding to Taiwanese Patent Application No. 110148443.
Office Action dated Feb. 23, 2026 issued in corresponding Indian Patent Application No. 202217042025.

* cited by examiner

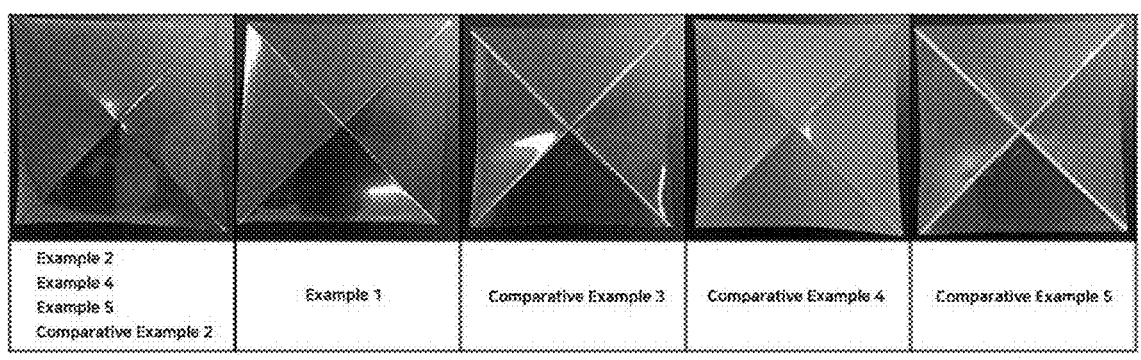
Example 2
Example 4
Example 5
Comparative Example 2
Example 1
Comparative Example 3
Comparative Example 4
Comparative Example 5

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application claims priority to Korean Patent Application No. 10-2021-0009292, filed on Jan. 22, 2021 in the Korean Intellectual Property Office, the disclosure of which is incorporated herein by reference.

TECHNICAL FIELD

The present invention relates to a thermoplastic resin composition, a method of preparing the same, and a molded article including the same. More particularly, the present invention relates to a thermoplastic resin composition that has excellent mechanical properties, such as impact strength, tensile strength, and flexural strength, surface hardness, transparency, and colorability and is capable of preventing occurrence of whitening during bending due to excellent non-whitening properties, a method of preparing the thermoplastic resin composition, and a molded article including the thermoplastic resin composition.

BACKGROUND ART

Acrylate-styrene-acrylonitrile copolymers (hereinafter referred to as "ASA resins") have good weather resistance, aging resistance, chemical resistance, rigidity, impact resistance, and processability, and are widely used in various fields such as automobiles, miscellaneous goods, and construction materials due to broad applicability thereof.

In addition, as the importance of aesthetics increases in the market, research is being conducted on a method of finishing the surface of a substrate, such as an acrylonitrile-butadiene-styrene resin, a polyvinyl chloride resin, a polyethylene terephthalate resin, and an iron plate, with an ASA resin to realize an aesthetically pleasing appearance and excellent colorability and weather resistance.

However, due to the characteristics of ASA resins, when finishing treatment is performed, whitening occurs on the surface of a product during processing such as cutting, bending, and molding depending on the shape of the product, resulting in loss of original color and deterioration of appearance. This whitening is caused by voids generated due to cracks inside an ASA resin. To solve this problem, a method of softening a resin by increasing a rubber content has been used. However, there are limitations in use due to mechanical properties different from those of a conventional ASA resin composition.

Therefore, there is a need to develop a thermoplastic resin composition having excellent transparency and colorability, having mechanical properties and surface hardness similar to those of conventional ASA resins, and being capable of preventing occurrence of whitening.

RELATED ART DOCUMENTS

Patent Documents

Japanese Patent No. 1995-033470

DISCLOSURE

Technical Problem

Therefore, the present invention has been made in view of the above problems, and it is one object of the present invention to provide a thermoplastic resin composition that has excellent mechanical properties, such as impact strength, tensile strength, and flexural strength, surface hardness, transparency, and colorability and is capable of preventing occurrence of whitening during bending due to excellent non-whitening properties.

It is still another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 35 to 85% by weight of an alkyl acrylate-aromatic vinyl compound-vinyl cyanide compound graft copolymer (A) containing alkyl acrylate rubber having an average particle diameter of 50 to 120 nm; and 15 to 65% by weight of a polymethacrylate resin (B), wherein the thermoplastic resin composition has an alkyl acrylate coverage value (X) of 70% or more as calculated by Equation 1 below:

$$X=\{(G-Y)/Y\}\times100, \qquad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a thermoplastic resin composition including 35 to 85% by weight of an alkyl acrylate-aromatic vinyl compound-vinyl cyanide compound graft copolymer (A) containing alkyl acrylate rubber having an average particle diameter of 50 to 120 nm; and 15 to 65% by weight of a polymethacrylate resin (B), wherein the polymethacrylate resin (B) has a weight average molecular weight of 50,000 to 150,000 g/mol.

In addition, the present invention may provide a thermoplastic resin composition including 35 to 85% by weight of an alkyl acrylate-aromatic vinyl compound-vinyl cyanide compound graft copolymer (A) containing alkyl acrylate rubber having an average particle diameter of 50 to 120 nm; and 15 to 65% by weight of a polymethacrylate resin (B), wherein the thermoplastic resin composition has a total light transmittance (Tt) of 75% or more as measured using a specimen having a thickness of 3T according to ASTM D1003.

In accordance with another aspect of the present invention, provided is a method of preparing a thermoplastic resin composition, the method including kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B), wherein the thermoplastic resin composition has an alkyl acrylate coverage value (X) of 70% or more as calculated by Equation 1 below:

$$X=\{(G-Y)/Y\}\times100, \qquad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a method of preparing a thermoplastic resin composition, the method including kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B), wherein the polymethacrylate resin (B) has a weight average molecular weight of 50,000 to 150,000 g/mol.

In addition, the present invention may provide a method of preparing a thermoplastic resin composition, the method including kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B), wherein the thermoplastic resin composition has a total light transmittance (Tt) of 75% or more as measured using a specimen having a thickness of 3T according to ASTM D1003.

In accordance with yet another aspect of the present invention, provided is a molded article including the thermoplastic resin composition.

Advantageous Effects

According to the present invention, the present invention has an effect of providing a thermoplastic resin composition that has excellent mechanical properties, such as impact strength, tensile strength, and flexural strength, surface hardness, transparency, and colorability and is capable of preventing occurrence of whitening during bending due to excellent non-whitening properties, a method of preparing the thermoplastic resin composition, and a molded article including the thermoplastic resin composition.

DESCRIPTION OF DRAWINGS

The FIGURE includes images showing whether whitening occurs on curved surfaces formed when extrusion sheet specimens having a thickness of 0.15 T manufactured in Examples 1, 2, 4, and 5 of the present invention and Comparative Examples 2 to 5 are folded by hand.

BEST MODE

Hereinafter, a thermoplastic resin composition, a method of preparing the same, and a molded article including the same according to the present invention will be described in detail.

The present inventors confirmed that, when an alkyl acrylate-aromatic vinyl compound-vinyl cyanide compound graft copolymer containing rubber having a predetermined average particle diameter and a polymethacrylate resin were mixed in a predetermined composition ratio, and an alkyl acrylate coverage value was adjusted within a predetermined range, compared to conventional ASA-based resins, mechanical properties, surface hardness, transparency, and colorability were improved, and occurrence of whitening was prevented due to excellent non-whitening properties. Based on these results, the present inventors conducted further studies to complete the present invention.

The thermoplastic resin composition of the present invention includes 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B), wherein the thermoplastic resin composition has an alkyl acrylate coverage value (X) of 70% or more as calculated by Equation 1 below. In this case, mechanical properties, such as impact strength, tensile strength, and flexural strength, surface hardness, transparency, and colorability may be excellent. In particular, due to excellent non-whitening properties, occurrence of whitening during bending may be prevented.

$$X=\{(G-Y)/Y\}\times100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

Hereinafter, each component constituting the thermoplastic resin composition of the present invention will be described in detail.

(A) Alkyl Acrylate-Aromatic Vinyl Compound-Vinyl Cyanide Compound Graft Copolymer For example, the graft copolymer (A) may contain alkyl acrylate rubber having an average particle diameter of 50 to 120 nm, preferably 60 to 120 nm, still more preferably 80 to 110 nm. Within this range, a finally prepared thermoplastic resin composition may have excellent impact strength, light resistance, and gloss.

In this description, the average particle diameter may be measured by dynamic light scattering, and specifically, may be measured as an intensity value using a particle size analyzer (product name: Nicomp 380, manufacturer: PSS) in a Gaussian mode. As a specific measurement example, a sample may be prepared by diluting 0.1 g of latex (total solids content: 35 to 50 wt %) 1,000 to 5,000-fold with distilled water, and average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 psec.

For example, based on a total weight of the components (A) and (B), the graft copolymer (A) may be included in an amount of 35 to 85% by weight, preferably 40 to 80% by weight, more preferably 50 to 80% by weight, still more preferably 60 to 80% by weight, still more preferably 60 to 75% by weight. Within this range, mechanical properties, such as impact strength, tensile strength, and flexural strength, gloss, and surface hardness may be excellent.

For example, the graft copolymer (A) may include 20 to 60% by weight of alkyl acrylate rubber (a-1) and 40 to 80% by weight of an aromatic vinyl compound-vinyl cyanide compound copolymer (a-2), preferably 30 to 50% by weight of alkyl acrylate rubber (a-1) and 50 to 70% by weight of an aromatic vinyl compound-vinyl cyanide compound copolymer (a-2), more preferably 40 to 50% by weight of alkyl acrylate rubber (a-1) and 50 to 60% by weight of an aromatic vinyl compound-vinyl cyanide compound copolymer (a-2). Within this range, mechanical properties, gloss, and surface hardness may be excellent.

For example, the alkyl acrylate rubber may be prepared by emulsion polymerization of an alkyl acrylate. As a specific example, the alkyl acrylate rubber may be prepared by mixing an alkyl acrylate, an emulsifier, an initiator, a grafting agent, a crosslinking agent, an electrolyte, and a solvent and performing emulsion polymerization of the mixture. In this case, grafting efficiency may be excellent, and thus physical properties such as impact resistance may be excellent.

In this description, a polymer including a certain compound means a polymer prepared by polymerizing the compound, and a unit in the polymer is derived from the compound.

For example, the alkyl acrylate rubber (a-1) may further include an aromatic vinyl compound. In this case, chemical resistance and impact resistance may be further improved. For example, based on 100% by weight in total of the acrylate rubber, the alkyl acrylate rubber (a-1) may include an aromatic vinyl compound in an amount of 0.1 to 35% by weight, preferably 1 to 30% by weight, more preferably 7 to 30% by weight, still more preferably 10 to 20% by weight. Within this range, mechanical properties, gloss, and surface hardness may be excellent without deterioration of physical properties.

For example, the copolymer (a-2) may further include an alkyl acrylate. In this case, physical property balance between impact resistance, weather resistance, processability, and non-whitening properties may be excellent.

For example, based on 100% by weight in total of the copolymer (a-2), the copolymer (a-2) may include 55 to 85% by weight of an aromatic vinyl compound, 10 to 30% by weight of a vinyl cyanide compound, and 0.1 to 35% by weight of an alkyl acrylate, preferably 60 to 80% by weight of an aromatic vinyl compound, 15 to 25% by weight of a vinyl cyanide compound, and 1 to 25% by weight of an alkyl acrylate, more preferably 65 to 75% by weight of an aromatic vinyl compound, 15 to 22% by weight of a vinyl cyanide compound, and 5 to 20% by weight of an alkyl acrylate. Within this range, impact resistance and weather resistance may be further improved.

For example, the graft copolymer (A) may be prepared by emulsion polymerization. In this case, gloss and surface hardness may be excellent.

For example, the alkyl acrylate may be an alkyl acrylate containing an alkyl group having 1 to 15 carbon atoms, preferably includes one or more selected from the group consisting of methyl acrylate, ethyl acrylate, propyl acrylate, butyl acrylate, 2-ethylbutyl acrylate, octyl acrylate, 2 ethylhexyl acrylate, hexyl acrylate, heptyl acrylate, n-pentyl acrylate, and lauryl acrylate. More preferably, the alkyl acrylate is an alkyl acrylate having 2 to 8 carbon atoms, still more preferably butyl acrylate or ethylhexyl acrylate, still more preferably butyl acrylate.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably one or more selected from the group consisting of styrene and α-methyl styrene, more preferably styrene. In this case, processability may be excellent due to proper fluidity, and mechanical properties such as impact resistance may be excellent.

For example, the vinyl cyanide compound may include one or more selected from the group consisting of acrylonitrile, methacrylonitrile, ethylacrylonitrile, and isopropylacrylonitrile, preferably acrylonitrile.

Emulsion polymerization methods commonly practiced in the art to which the present invention pertains may be used in the present invention without particular limitation.

For example, the graft copolymer (A) may have a grafting degree of 60 to 150%, preferably 62 to 140%, more preferably 65 to 130%, still more preferably 65 to 100% as calculated by Equation 3 below. Within this range, gloss, colorability, and transparency may be excellent.

$$\text{Grafting degree (\%)} = [\text{Weight (g) of grafted monomers/Rubber weight (g)}] \times 100 \qquad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

When the weight (g) of insoluble matter (gel) is measured, 0.5 g of powdered graft copolymer (A) is added to 50 ml of acetone, followed by stirring at room temperature for 12 hours. Then, centrifugation is performed to separate insoluble matter that is not dissolved in acetone, followed by drying for 12 hours. Then, the weight of the insoluble matter (gel) is measured. The rubber weight (g) is the weight (g) of rubber components theoretically added to 0.5 g of the powdered graft copolymer (A).

As a specific measurement example, when measuring the weight (g) of insoluble matter (gel), 0.5 g of a powdered graft copolymer is added to 50 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the weight of the insoluble matter (gel) is measured.

(B) Polymethacrylate Resin

For example, based on a total weight of the components (A) and (B), the polymethacrylate resin (B) may be included in an amount of 15 to 65% by weight, preferably 20 to 60% by weight, more preferably 20 to 50% by weight, still more preferably 20 to 40% by weight, still more preferably 25 to 40% by weight. Within this range, mechanical properties, such as impact strength, tensile strength, and flexural strength, surface hardness, transparency, and colorability may be excellent. In particular, due to excellent non-whitening properties, occurrence of whitening during bending may be prevented.

For example, the polymethacrylate resin (B) may have a weight average molecular weight of 50,000 to 150,000 g/mol, preferably 60,000 to 140,000 g/mol, more preferably 70,000 to 130,000 g/mol, still more preferably 80,000 to 120,000 g/mol. Within this range, weather resistance may be further improved, and tensile strength and impact strength may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+

1×PLgel 10 μm MiniMix-B (250×4.6 mm)+lx PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

The polymethacrylate resin (B) preferably includes a methacrylate monomer in an amount of 55% by weight or more, more preferably 60% by weight or more, still more preferably 65% by weight or more. Within this range, weather resistance may be greatly improved, and gloss and colorability may be excellent.

For example, the methacrylate monomer may be an alkyl methacrylate containing an alkyl group having 1 to 15 carbon atoms, preferably includes one or more selected from the group consisting of methyl methacrylate, ethyl methacrylate, butyl methacrylate, 2-ethylbutyl methacrylate, 2-ethylhexyl methacrylate, and lauryl methacrylate. More preferably, the methacrylate monomer is an alkyl methacrylate containing an alkyl group having 1 to 4 carbon atoms, still more preferably methyl methacrylate.

The polymethacrylate resin (B) preferably includes one Or more selected from the group consisting of a polymethylmethacrylate resin and a methylmethacrylate-styrene-acrylonitrile copolymer. More preferably, the polymethacrylate resin (B) is a polymethylmethacrylate resin or a methylmethacrylate-styrene-acrylonitrile copolymer, still more preferably a polymethylmethacrylate resin. Within this range, weather resistance may be further improved, and transparency and colorability may be excellent.

For example, the methylmethacrylate-styrene-acrylonitrile copolymer may include 65 to 85% by weight of methylmethacrylate, 5 to 30% by weight of styrene, and 5 to 10% by weight of acrylonitrile, preferably 70 to 80% by weight of methylmethacrylate, 15 to 25% by weight of styrene, and 5 to 10% by weight of acrylonitrile. Within this range, weather resistance may be further improved, and transparency and colorability may be excellent.

For example, the methylmethacrylate-styrene-acrylonitrile copolymer may have a weight average molecular weight of 70,000 to 140,000 g/mol. Preferably, the methylmethacrylate-styrene-acrylonitrile copolymer has a weight average molecular weight of 70,000 to 90,000 g/mol, a weight average molecular weight of greater than 90,000 g/mol and less than or equal to 140,000 g/mol, or a weight average molecular weight of a combination thereof. Within this range, weather resistance may be further improved, and tensile strength, flexural strength, and impact strength may be excellent.

The polymethacrylate resin (B) may be prepared by solution polymerization, bulk polymerization, emulsion polymerization, or suspension polymerization. Solution polymerization, bulk polymerization, emulsion polymerization, and suspension polymerization commonly practiced in the art to which the present invention pertains may be used in the present invention without particular limitation.
Thermoplastic Resin Composition The thermoplastic resin composition of the present invention preferably has an alkyl acrylate coverage value (X) of 70% or more, preferably 70 to 150%, more preferably 75 to 140%, still more preferably 80 to 130%, still more preferably 85 to 110% as calculated by Equation 1 below. Within this range, transparency and colorability may be excellent. In particular, due to excellent non-whitening properties, occurrence of whitening during bending may be prevented.

$$X = \{(G-Y)/Y\} \times 100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In Equation 1, the content of the alkyl acrylate in the gel of the thermoplastic resin composition is the content of an alkyl acrylate (based on 100% by weight in total of the added thermoplastic resin composition) in insoluble matter obtained in the process of measuring the gel content. Here, the gel content is the content of insoluble matter based on 100% by weight in total of the thermoplastic resin composition.

The content of an alkyl acrylate in the gel may be quantitatively measured by nuclear magnetic resonance (NMR) analysis or Fourier transform infrared spectroscopy (FT-IR) analysis.

In this description, unless otherwise specified, NMR analysis means analysis by $^1$H NMR.

In this description, NMR analysis commonly performed in the art may be used in the present invention, and a specific measurement example is as follows.

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5 s, TCE-d2, at room temperature In this description, FT-IR analysis commonly performed in the art may be used in the present invention, and a specific measurement example is as follows.

Equipment name: Agilent Cary 660

Measurement conditions: ATR mode

When measuring the gel content, 1 g of a thermoplastic resin composition is added to 30 g of acetone, followed by stirring at room temperature for 12 hours. Then, centrifugation is performed to separate insoluble matter that is not dissolved in acetone, followed by drying for 12 hours. Then, the gel content is measured and calculated by Equation 2 below. As a specific measurement example, when measuring the gel content, 1 g of a thermoplastic resin composition is added to 30 g of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the gel content is measured.

$$\text{Gel content (\%)} = [\text{Weight (g) of insoluble matter} \\ \text{(gel)/Weight (g) of sample}] \times 100 \qquad \text{[Equation 2]}$$

In this description, the alkyl acrylate coverage value is a parameter for measuring the degree of dispersion of an aromatic vinyl compound-vinyl cyanide compound polymer grafted onto alkyl acrylate rubber in the thermoplastic resin composition. When the alkyl acrylate coverage value is high, the aromatic vinyl compound-vinyl cyanide compound polymer is evenly grafted onto the alkyl acrylate rubber to cover the alkyl acrylate rubber uniformly, thereby increasing gloss and achieving excellent tensile strength and colorability. In addition, as the alkyl acrylate coverage value increases, the distance between rubber particles is decreased, thereby reducing voids due to cracks occurring inside the thermoplastic resin composition and suppressing whitening during bending.

In addition, the alkyl acrylate coverage value is obtained by quantitatively calculating the content of the alkyl acrylate present in the thermoplastic resin composition through nuclear magnetic resonance (NMR) analysis or Fourier transform infrared spectroscopy (FT-IR) analysis, and the grafting degree is obtained based on the content of rubber components added during polymerization.

In addition, the grafting degree is a parameter indicating a degree to which the aromatic vinyl compound-vinyl cyanide compound polymer is grafted onto the alkyl acrylate in an alkyl acrylate-aromatic vinyl compound-vinyl cyanide compound graft copolymer.

For example, the thermoplastic resin composition may have a total light transmittance (Tt) of 75% or more, preferably 80% or more, more preferably 80 to 95%, still more preferably 82 to 90% as measured using a specimen having a thickness of 3T according to ASTM D1003. Within this range, physical property balance, transparency, colorability, and non-whitening properties may be excellent.

For example, the thermoplastic resin composition may have a haze of 11% or less, preferably 8% or less, more preferably 6% or less, still more preferably 0.1 to 6% as measured using a specimen having a thickness of 3T according to ASTM D1003. Within this range, physical property balance, transparency, colorability, and non-whitening properties may be excellent.

For example, the thermoplastic resin composition may have a gloss of 120 or more, preferably 125 or more, more preferably 125 to 150, still more preferably 133 to 145 as measured at 45° using a gloss meter according to ASTM D2457. Within this range, physical property balance, transparency, colorability, and non-whitening properties may be excellent.

For example, when a 1 kg weight is vertically dropped onto an extrusion film having dimensions of 0.15 mm×5 cm×5 cm in thickness, width, and length from a height of 25 cm using a Gardner impact tester, haze values before and after impact are measured for a portion of the film hit by the weight according to ASTM D1003, and a difference in the haze values is calculated, the thermoplastic resin composition may have a haze difference (Δhaze) of 10 or less, preferably 8 or less, more preferably 5 or less, still more preferably 4 or less, still more preferably 3 or less, still more preferably 0.1 to 3. Within this range, physical property balance, appearance, and non-whitening properties may be excellent.

For example, the thermoplastic resin composition may have an Izod impact strength (specimen thickness: ¼", room temperature) of 3 kgf·cm/cm or more, preferably 3.5 kgf·cm/cm or more, more preferably 3.5 to 10 kgf·cm/cm, still more preferably 4 to 9 kgf·cm/cm, still more preferably 4.5 to 8.5 kgf·cm/cm as measured according to ASTM D256. Within this range, physical property balance and non-whitening properties may be excellent.

In this description, the room temperature may be a temperature within 20±5° C.

For example, the thermoplastic resin composition may have a tensile strength of 200 kgf/cm$^2$ or more, preferably 250 kgf/cm$^2$ or more, more preferably 300 kgf/cm$^2$ or more, still more preferably 300 to 600 kgf/cm$^2$, still more preferably 350 to 600 kgf/cm$^2$ as measured at a rate of 10 mm/min using a specimen having a thickness of 3.2 mm according to ASTM D638. Within this range, physical property balance and non-whitening properties may be excellent.

For example, the thermoplastic resin composition may have a flexural strength of 350 kgf/cm$^2$ or more, preferably 450 kgf/cm$^2$ or more, more preferably 500 kgf/cm$^2$ or more, still more preferably 500 to 900 kgf/cm$^2$ as measured at a span of 64 mm and a test speed of 10 mm/min using a specimen having a thickness of 3.2 mm according to ASTM D790. Within this range, physical property balance and non-whitening properties may be excellent.

For example, the thermoplastic resin composition may have a Rockwell hardness of 70 or more, preferably 80 or more, more preferably 80 to 110 as measured in an R-scale according to ASTM D785. Within this range, occurrence of press marks may be prevented, and physical property balance may be excellent.

When necessary, based on 100 parts by weight in sum of the graft copolymer (A) and the polymethacrylate resin (B), the thermoplastic resin composition may further include 0.01 to 5 parts by weight, preferably 0.05 to 3 parts by weight, more preferably 0.1 to 2 parts by weight, still more preferably 0.2 to 1.5 parts by weight of each of one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

The heat stabilizer preferably includes a primary heat stabilizer and a secondary heat stabilizer.

The primary heat stabilizer is preferably a phenolic heat stabilizer, and more preferably includes one or more selected from the group consisting of 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,6-hexanediolbis-[3-(3,5-di-t-butyl-4-hydroxyphenyl)propionate], 2,2-thiodiehylenebis-[3-(3,5-di-t-butyl-4-hydroxyphenyl)propionate], 3,5-di-t-butyl-4-hydroxybenzylphosphonatediethyl ester, tris(2,6-dimethyl-3-hydroxy-4-t-butylbenzyl)isocyanurate, tris(3,5-di-t-butyl-4-hydroxybenzyl)isocyanurate, tris[(3,5-di-t-butyl-4-hydroxyphenyl)propionyloxyethyl]isocyanurate, tris(4-t-butyl-2,6-dimethyl-3-hydroxybenzyl)isocyanurate, 2,2'-methylenebis(4-methyl-6-t-butylphenol)terephthalate, 1,3,5-trimethyl-2,4,6-tris(3,5-di-t-butyl-4-hydroxybenzyl) benzene, 3,9-bis[1,1-dimethyl-2-{β-(3-t-butyl-4-hydroxy-5-methyl-phenyl)propionyloxy}ethyl]-2,4,8,10-tetraoxaspiro [5,5]undecane, 2,2-bis[4-(2-3,5-di-t-butyl hydroxyhydrocinnamoyloxy)ethoxyphenyl]propane, and β-(3,5-di-t-butyl-4-hydroxyphenyl)propionic acid stearyl ester, still more preferably octadecyl 3-(3,5-ditert-butyl hydroxyphenyl)propanoate (IR1076).

The secondary heat stabilizer is preferably a phosphorus heat stabilizer, and more preferably includes one or more selected from the group consisting of bis(diakylphenyl) pentaerythritol diphosphite ester, phosphite ester, trioctyl phosphite, trilauryl phosphite, tridecyl phosphite, (octyl) diphenyl phosphite, tris(2,4-di-t-butylphenyl) phosphite, triphenyl phosphite, tris(butoxyethyl) phosphite, tris(nonylphenyl) phosphite, distearylpentaerythritol diphosphite, tetra(tridecyl)-1,1,3-tris(2-methyl-5-t-butyl-4-hydroxy-phenyl)butane diphosphite, tetra(C12-C15 mixed alkyl)-4,4'-isopropylidenediphenyl diphosphite, tetra(tridecyl)-4,4'-butylidenebis(3-methyl-6-t-butylphenol)diphosphite, tris (mono- and di-mixed nonylphenyl)phosphite, hydrogenated 4,4'-isopropylidenediphenol polyphosphite, phenyl(4,4'-isopropylidenediphenol)pentaerythritol diphosphite, distearylpentaerythritol diphosphite, tris[4,4'-isopropylidenebis(2-t-butylphenol)] phosphite, di(isodecyl)phenyl phosphite, 4,4'- isopropylidenebis(2-t-butylphenol)bis(nonylphenyl) phosphite, bis(2,4-di-t-butyl methylphenyl)ethyl phosphite, 2-[{2,4,8,10-tetra-t-butyldibenz[d,f][1.3.2]-dioxa-phospepin-6-yl}oxy]-N,N-bis[2-[{2,4,8,10-tetra-t-butyl-dibenz[d, f][1.3.2]-dioxaphospepin-6-yl}oxy]ethyl]-ethanamine, and 6-[3-(3-t-butyl-4-hydroxy-5-methylphenyl)propoxy]-2,4,8, 10-tetra-t-butyldibenz[d,f][1.3.2]-dioxaphospepin, still more preferably tris(2,4-di-tert-butylphenyl) phosphite (IF168).

The lubricant preferably includes one or more selected from the group consisting of an aliphatic amide-based lubricant, a fatty acid ester-based lubricant, and olefin-based wax.

The aliphatic amide-based lubricant preferably includes one or more selected from the group consisting of stearamide, oleamide, erucamide, ethylene bis stearamide, and ethylene bis oleamide.

The fatty acid ester-based lubricant preferably includes one or more selected from the group consisting of fatty acid esters of alcohols or polyhydric alcohols, hardened oil, butyl stearate, monoglyceride stearate, pentaerythritol tetrastearate, stearylstearate, ester wax, and alkyl phosphoric acid ester.

The olefin-based wax is preferably polyethylene wax.

For example, the light stabilizer may include one or more selected from the group consisting of a HALS-based UV stabilizer and a benzotriazole-based UV stabilizer, preferably a mixture of a HALS-based UV stabilizer and a benzotriazole-based UV stabilizer.

The HALS-based UV stabilizer preferably includes one or more selected from the group consisting of bis(2,2,6,6-tetramethyl-4-piperidinyl) sebacate (UV 770), bis[N-methyl-2,2,6,6-tetramethyl-4-piperidinyl]sebacate, and succinic acid dimethyl-1-(2-hydroxyethyl)-4-hydroxy-2,2,6,6-tetramethylpiperidine (Tinuvin 622), more preferably bis(2, 2,6,6-tetramethyl-4-piperidinyl)sebacate (UV 770).

The benzotriazole-based UV stabilizer preferably includes one or more selected from the group consisting of 2-(2'-hydroxy-5'-t-octylphenyl)-benzotriazole (Cyasorb UV-541), 2-(2'-hydroxy-5'-methylphenyl)benzotriazole (Tinuvin-P), 2-(2'-hydroxy-3'-tert-butyl-5'-methylphenyl)-5-chloro-benzotriazole (Tinuvin-326), 2-(2'-hydroxy-3',5'-ditert-butylphenyl) chloro-benzotriazole (Tinuvin-327), 2-(2'-hydroxy-3,5-ditert-amylphenyl)benzotriazole (Tinuvin-328), 2-(2'-hydroxy-3',5'-di(1,1-dimethylbenzyl)phenyl]-2H-benzotriazole (Tinuvin-234), 2-(2'-hydroxy-3',5'-di-t-butylphenyl)benzotriazole (Tinuvin-320), and 2-(2H-benzotriazole-2-yl)-4-(1,1,3,3-tetramethylbutyl)phenol (UV 329), more preferably 2-(2H-benzotriazole-2-yl)-4-(1,1,3,3-tetramethylbutyl)phenol (UV 329).

Method of Preparing Thermoplastic Resin Composition

A method of preparing the thermoplastic resin composition of the present invention includes a step of kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B), wherein the thermoplastic resin composition has an alkyl acrylate coverage value (X) of 70% or more as calculated by Equation 1 below. In this case, mechanical properties, such as impact strength, tensile strength, and flexural strength, surface hardness, transparency, and colorability may be excellent. In particular, due to excellent non-whitening properties, occurrence of whitening during bending may be prevented.

$$X=\{(G-Y)/Y\}\times100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

The method of preparing the thermoplastic resin composition shares all the technical characteristics of the thermoplastic resin composition described above, and thus repeated description thereof will be omitted.

The kneading and extrusion step is preferably performed at 200 to 300° C. in a size of 10 to 199 pi, more preferably at 210 to 260° C. in a size of 20 to 80 pi, still more preferably at 220 to 250° C. in a size of 25 to 75 pi using an extrusion kneader. Within this range, extrusion may be performed stably, and kneading may be performed efficiently. At this time, the temperature is cylinder temperature, and the pi means the outer diameter of a screw (unit: mm).

Extrusion kneaders commonly used in the art to which the present invention pertains may be used without particular limitation, and a twin-screw extrusion kneader is preferably used.

Molded Article

A molded article of the present invention includes the thermoplastic resin composition. In this case, mechanical properties, such as impact strength, tensile strength, and flexural strength, surface hardness, transparency, and colorability may be excellent. In particular, due to excellent non-whitening properties, occurrence of whitening during bending may be prevented.

The molded article is preferably an injection-molded article, a calendering-molded article, or a T-die extrusion-molded article. In this case, mechanical properties, such as impact strength, tensile strength, and flexural strength, surface hardness, transparency, colorability, and non-whitening properties may be excellent.

The molded article is preferably a film or a sheet. Specifically, the molded article may be a decorative sheet for finishing, a finishing material for outdoor construction materials, or a finishing material for roofs.

A method of manufacturing the molded article preferably includes a step of kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethacrylate resin (B) to obtain an extrudate and a step of performing injection molding, calender molding, or T-die extrusion molding of the extrudate at a molding temperature of 180 to 300° C. to manufacture a molded article. In this case, mechanical properties, such as impact strength, tensile strength, and flexural strength, surface hardness, transparency, and colorability may be excellent. In particular, due to excellent non-whitening properties, occurrence of whitening during bending may be prevented.

For example, the extrudate may be in the form of pellets or in the form a plate.

In this description, the plate-like shape is not particularly limited when the plate-like shape is commonly defined as a plate-like shape in the technical field to which the present invention pertains, and may include, for example, a flat shape, a sheet shape, a film shape, and the like.

Preferably, the step of manufacturing a molded article includes a step of calender-molding the prepared extrudate at a calender temperature of 140 to 220° C. to obtain a sheet.

In this case, processability may be excellent, and a sheet having a uniform surface may be easily manufactured.

In this description, calender molding is a process of rolling an extrudate using calendering equipment including calendering rolls. Without particular limitation, calender molding may be performed according to a method commonly used in the art to which the present invention pertains. Preferably, calender molding is performed according to a method including a step of mixing thermoplastic resin composition pellets as a sheet raw material at 130 to 200° C. using a mixer, a step of manufacturing a base sheet at 170 to 200° C. using the mixed raw material, and a step of manufacturing a sheet at 140 to 220° C. using the base sheet and calendering rolls. For example, the step of manufacturing a base sheet may be performed using a mixing roll.

The method of manufacturing a molded article preferably includes a step of injection-molding the prepared extrudate at an injection temperature of 200 to 260° C., an injection pressure of 60 to 100 bar, and a holding pressure of 25 to 55 bar. In this case, an injection-molded article having excellent mechanical properties such as impact strength may be easily manufactured.

The injection temperature is preferably 200 to 230° C., more preferably 210 to 220° C. Within this range, an injection-molded article having excellent mechanical properties such as impact strength may be easily manufactured.

The injection pressure is preferably 70 to 90 bar, more preferably 75 to 85 bar. Within this range, an injection-molded article having excellent mechanical properties such as impact strength may be easily manufactured.

The holding pressure is preferably 30 to 50 bar, more preferably 35 to 50 bar. Within this range, an injection-molded article having excellent mechanical properties such as impact strength may be easily manufactured.

The step of manufacturing a molded article preferably includes a step of performing T-die extrusion molding of the prepared extrudate at an extrusion temperature of 200 to 300° C., an extrusion screw speed of 50 to 200 rpm, a 3-axis roll temperature of 60 to 100° C., and a roll rotation speed of 1 to 5 m/min. In this case, processability may be excellent, and a sheet having a uniform surface may be easily manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

ASA graft copolymer (A-1): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 100 nm prepared by emulsion polymerization ASA graft copolymer (A-2): ASA graft copolymer (core: 32% by weight of butyl acrylate and 13% by weight of styrene, shell: 4% by weight of butyl acrylate, 40% by weight of styrene, and 11% by weight of acrylonitrile, grafting degree: 70%) containing alkyl acrylate rubber having an average particle diameter of 100 nm prepared by emulsion polymerization ASA graft copolymer (A-3): ASA graft copolymer (core: 37% by weight of butyl acrylate and 3% by weight of styrene, shell: 12% by weight of butyl acrylate, 37% by weight of styrene, and 11% by weight of acrylonitrile, grafting degree: 120%) containing alkyl acrylate rubber having an average particle diameter of 100 nm prepared by emulsion polymerization ASA graft copolymer (A-4): ASA graft copolymer (core: 30% by weight of butyl acrylate, shell: 12% by weight of butyl acrylate, 47% by weight of styrene, and 11% by weight of acrylonitrile, grafting degree: 70%) containing alkyl acrylate rubber having an average particle diameter of 150 nm prepared by emulsion polymerization ASA graft copolymer (A-5): ASA graft copolymer (core: 30% by weight of butyl acrylate, shell: 12% by weight of butyl acrylate, 47% by weight of styrene, and 11% by weight of acrylonitrile, grafting degree: 70%) containing alkyl acrylate rubber having an average particle diameter of 100 nm prepared by emulsion polymerization ASA graft copolymer (A-6): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 30 nm prepared by emulsion polymerization ASA graft copolymer (A-7): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 150 nm prepared by emulsion polymerization ASA graft copolymer (A-8): ASA graft copolymer (core: 45% by weight of butyl acrylate, shell: 44% by weight of styrene and 11% by weight of acrylonitrile, grafting degree: 50%) containing alkyl acrylate rubber having an average particle diameter of 100 nm prepared by emulsion polymerization Polymethacrylate resin (B-1): Polymethylmethacrylate resin (IF850, LG MMA Co.) having a weight average molecular weight of 80,000 g/mol Styrene-acrylonitrile resin (B-2): 90HR (weight average molecular weight: 100,000 g/mol, LG Chemical Co).

Examples 1 to 7 and Comparative Examples 1 to 8

According to the contents shown in Tables 1 and 2, the components shown in Tables 1 and 2 were fed into a twin-screw extruder. At this time, 1 part by weight of a pentaerythritol derivative (Pasflow7501, Patechfine Chemical Co.) as a lubricant, 0.5 parts by weight of each of Irgonox 1076 (BASF Co.) and Irgafos 168 (BASF Co.) as antioxidants, and 1 part by weight of each of Tinuvin 700 (BASF Co.) and Sunsorb 329 (Sunfine Global Co.) as UV stabilizers were fed into the twin-screw extruder. Then, melt-kneading and extrusion was performed at 230° C. and 150 rpm to prepare pellets. Using the prepared pellets, an alkyl acrylate coverage value was measured. Then, the prepared pellets were injected at a molding temperature of 220° C., an injection pressure of 50 bar, and a holding pressure of 35 bar using an injection machine (Victory 330/80, Engel Co.) to obtain a specimen for measuring appearance and physical properties. Using the specimen, impact strength, tensile strength, flexural strength, surface hardness, gloss, light transmittance, and haze were measured. In addition, using a T-die extruder (Techline 20T, screw: 20 mm, L/D=25, Collins Co.), the pellets were extruded at a molding temperature of 230° C., a molding pressure of 200 kgf/cm², a roll temperature of 85° C., and a roll rotation speed of 3.5 m/min to obtain a film having a thickness of 0.15 T, and non-whitening properties were evaluated.

TEST EXAMPLES

The properties of injection specimens and extrusion specimens prepared in Examples 1 to 7 and Comparative Examples 1 to 8 were measured according to the following methods, and the results are shown in Tables 1 and 2 and the FIGURE.
Measurement Methods
    Alkyl acrylate coverage value (%): Alkyl acrylate coverage value was calculated by Equation 1 below.

$$X=\{(G-Y)/Y\}\times100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition. Here, the content of the alkyl acrylate in the gel was quantitatively measured through $^1$H NMR analysis or FT-IR analysis.
$^1$H NMR
    Equipment name: Bruker 600 MHz NMR (AVANCE III HD) CPP BB (1H 19F tunable and broadband, with z-gradient) Prodigy Probe
    Measurement conditions: $^1$H NMR (zg30): ns=32, d1=5 s, TCE-d2, at room temperature
FT-IR
    Equipment name: Agilent Cary 660
    Measurement conditions: ATR mode
When measuring the gel content, 1 g of pellets obtained by extruding a thermoplastic resin composition was added to 30 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the gel content was measured and calculated by Equation 2 below.

$$\text{Gel content (\%)}=[\text{Weight (g) of insoluble matter (gel)/Weight (g) of sample}]\times100 \qquad \text{[Equation 2]}$$

Grafting degree (%): 0.5 g of a powdered graft copolymer was added to 50 ml of acetone, stirred at room temperature for 12 hours, and centrifuged to separate insoluble matter that was not dissolved in acetone, followed by drying for 12 hours. The weight of the insoluble matter was measured, and grafting degree was calculated by Equation 3 below. The rubber weight is the weight (g) of rubber components theoretically added to 0.5 g of the powdered graft copolymer.

$$\text{Grafting degree (\%)}=[\text{Weight (g) of grafted monomers/Rubber weight (g)}]\times100 \qquad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

Specifically, when measuring the weight (g) of insoluble matter (gel), 0.5 g of a powdered graft copolymer was added to 50 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the weight of the insoluble matter (gel) was measured.

Izod impact strength (kgf-cm/cm): Izod impact strength was measured at 23° C. using a notched specimen (thickness: ¼") according to ASTM D256.

Tensile strength (kgf/cm²): Tensile strength was measured at a cross head speed of 10 mm/min using a specimen having a thickness of 3.2 mm according to ASTM D638.

Flexural strength (kgf/cm²): Flexural strength was measured at a span of 64 mm and a test speed of 10 mm/min using a specimen having a thickness of 3.2 mm according to ASTM D790.

Surface hardness: Rockwell hardness was measured in an R-scale according to ASTM D785.

Gloss: Gloss was measured at 45° using a gloss meter according to ASTM D2457.

Total light transmittance (Tt, %): Total light transmittance was measured using a specimen having a thickness of 3T and a haze meter (HM-150, Murakami Lab Co.) according to ASTM D1003.

Haze (%): Haze was measured using a specimen having a thickness of 3T and a haze meter (HM-150, Murakami Lab Co.) according to ASTM D1003.

Whether whitening occurs: An extrusion sheet (thickness: 0.15 T, width: 5 cm, length: 5 cm) was folded diagonally by hand. Then, whether whitening occurred on bent surfaces was judged by visual observation, and non-whitening properties were evaluated as follows.

○: No whitening occurs, indicating that non-whitening properties are excellent.

Δ: Whitening occurs slightly, indicating that non-whitening properties are moderate.

X: Whitening occurs clearly, indicating that non-whitening properties are poor.

Haze difference (Δhaze) according to ball dropping: A 1 kg weight was vertically dropped onto an extrusion film having dimensions of 0.15 mm×5 cm×5 cm in thickness, width, and length from a height of 25 cm using a Gardner impact tester. Then, haze values before and after impact at a portion of the film hit by the weight were measured according to ASTM D1003, and haze difference was calculated by Equation 4 below.

$$\text{Haze difference (\Delta haze)}=\text{Haze value after ball dropping}-\text{haze value before ball dropping} \qquad \text{[Equation 4]}$$

TABLE 1

| Classification (parts by weight) | Example 1 | Example 2 | Example 3 | Example 4 | Example 5 | Example 6 | Example 7 |
|---|---|---|---|---|---|---|---|
| ASA (A-1) | 40 | 50 | 60 | 70 | 80 | | |
| ASA (A-2) | | | | | | 50 | |
| ASA (A-3) | | | | | | | 50 |
| PMMA (B-1) | 60 | 50 | 40 | 30 | 20 | 50 | 50 |
| Rubber particle diameter (nm) of ASA (A) | 100 | 100 | 100 | 100 | 100 | 100 | 100 |
| Grafting degree (%) of ASA (A) | 70 | 70 | 70 | 70 | 70 | 70 | 120 |
| Alkyl acrylate coverage value (%) | 90 | 90 | 90 | 90 | 90 | 123 | 89 |
| Physical properties | | | | | | | |
| Impact strength (kgf · cm/cm) | 3.5 | 4 | 5 | 6 | 7 | 3 | 3 |
| Tensile strength (kgf/cm$^2$) | 500 | 400 | 350 | 300 | 250 | 400 | 400 |
| Flexural strength (kgf/cm$^2$) | 800 | 650 | 550 | 450 | 400 | 650 | 650 |
| Surface hardness | 105 | 100 | 90 | 80 | 70 | 105 | 100 |
| Gloss | 145 | 140 | 125 | 130 | 125 | 140 | 140 |
| Total light transmittance (Tt, %) | 75 | 80 | 82 | 85 | 75 | 80 | 80 |
| Haze (%) | 10 | 7 | 5 | 4 | 6 | 7 | 7 |
| Whether whitening occurs | Δ | ○ | ○ | ○ | ○ | ○ | ○ |
| Haze difference (Δhaze) | 5 | 4 | 3 | 2.5 | 1.5 | 2 | 2 |

TABLE 2

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| ASA (A-1) | 30 | 90 | | 50 | | | | |
| ASA (A-4) | | | 50 | | | | | |
| ASA (A-5) | | | | | 50 | | | |
| ASA (A-6) | | | | | | 50 | | |
| ASA (A-7) | | | | | | | 50 | |
| ASA (A-8) | | | | | | | | 50 |
| PMMA (B-1) | 70 | 10 | 50 | | | 50 | 50 | 50 |
| SAN (B-2) | | | | 50 | 50 | | | |
| Rubber particle diameter (nm) of ASA (A) | 100 | 100 | 150 | 100 | 100 | 30 | 150 | 100 |
| Grafting degree (%) of ASA (A) | 70 | 70 | 70 | 70 | 70 | 70 | 70 | 50 |
| Alkyl acrylate coverage value (%) | 90 | 90 | 52 | 90 | 52 | 90 | 90 | 50 |
| Physical properties | | | | | | | | |
| Impact strength (kgf · cm/cm) | 3 | 10 | 8 | 5 | 5 | 1.5 | 5 | 5 |
| Tensile strength (kgf/cm$^2$) | 550 | 200 | 480 | 450 | 450 | 350 | 450 | 450 |

TABLE 2-continued

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Flexural strength (kgf/cm$^2$) | 850 | 350 | 780 | 600 | 600 | 500 | 600 | 600 |
| Surface hardness | 110 | 55 | 105 | 90 | 95 | 100 | 95 | 95 |
| Gloss | 150 | 115 | 80 | 100 | 100 | 145 | 100 | 140 |
| Total light transmittance (Tt, %) | 70 | 73 | 40 | 20 | 60 | 35 | 60 | 82 |
| Haze (%) | 15 | 6 | 65 | 90 | 55 | 5 | 50 | 5 |
| Whether whitening occurs | X | ○ | X | ○ | X | ○ | X | X |
| Haze difference (Δhaze) | 15 | 1.5 | 40 | 3 | 40 | 4 | 40 | 40 |

As shown in Tables 1 and 2, compared to Comparative Examples 1 to 8 outside of the present invention, in the case of Examples 1 to 7 according to the present invention, mechanical properties, such as impact strength, tensile strength, and flexural strength, and surface hardness were excellent. In addition, due to high gloss and total light transmittance and low haze, transparency and colorability were excellent. In addition, due to excellent non-whitening properties, occurrence of whitening was prevented during bending. Specifically, in the case of Comparative Example 1 including the ASA resin (A) in an amount less than the range of the present invention, impact strength was low, haze increased, and whitening occurred. In the case of Comparative Example 2 including the ASA resin (A) in an amount exceeding the range of the present invention, in addition to tensile strength, flexural strength, and surface hardness, gloss decreased, resulting in decrease in transparency.

In addition, in the case of Comparative Example 3 including the ASA resin (A) having an alkyl acrylate coverage value less than the range of the present invention and the ASA resin containing alkyl acrylate rubber having an average particle diameter greater than 120 nm, gloss, total light transmittance, and haze were poor, and transparency decreased.

In addition, in the case of Comparative Example 4 including the styrene-acrylonitrile resin (B-2) instead of the polymethacrylate resin (B-1), gloss, total light transmittance, and haze were poor, and transparency decreased.

In addition, in the case of Comparative Example 5 including the styrene-acrylonitrile resin (B-2) and the ASA resin (A) having a grafting degree within the range of examples of the present invention and an alkyl acrylate coverage value less than the range of the present invention, total light transmittance and haze were poor, resulting in decrease in transparency and occurrence of whitening.

In addition, in the case of Comparative Example 6 including the ASA resin containing alkyl acrylate rubber having an average particle diameter less than 50 nm, impact strength and total light transmittance were very low. In the case of Comparative Example 7 including the ASA resin containing alkyl acrylate rubber having an average particle diameter greater than 120 nm, whitening occurred, and haze and haze difference increased.

In addition, in the case of Comparative Example 8 having an alkyl acrylate coverage value of 50%, whitening occurred, and haze difference increased.

In addition, as shown in the FIGURE below, it can be seen that, compared to Comparative Examples 3 to 5, occurrence of whitening is prevented in Examples 1, 2, 4, and 5 according to the present invention. In the case of Comparative Example 2, occurrence of whitening is prevented, but tensile strength, flexural strength, and surface hardness are very low. Accordingly, it is difficult to use the composition of Comparative Example 2 in the manufacture of products.

The invention claimed is:

1. A thermoplastic resin composition, comprising:
35 to 85% by weight of an alkyl acrylate-aromatic vinyl compound-vinyl cyanide compound graft copolymer (A) containing alkyl acrylate rubber having an average particle diameter of 50 to 120 nm; and
15 to 65% by weight of a polymethylmethacrylate resin (B),
wherein the thermoplastic resin composition has an alkyl acrylate coverage value (X) of 70% or more as calculated by Equation 1 below:

$$X=\{(G-Y)/Y\}\times100, \qquad \text{[Equation 1]}$$

wherein G represents a content (wt %) of a gel based on a total weight of the thermoplastic resin composition, and Y represents a content (wt %) of the alkyl acrylate in the gel based on the total weight of the thermoplastic resin composition,
wherein the content of the gel is measured by a method that includes: adding 1 g of a thermoplastic resin composition to 30 g of acetone, followed by stirring at room temperature for 12 hours, then performing centrifugation to separate insoluble matter that is not dissolved in acetone, followed by drying for 12 hours, and measuring and calculating the content of the gel from by Equation 2:

$$\text{Content of gel (\%)=[Weight (g) of insoluble matter (gel)/Weight (g) of sample]}\times100. \qquad \text{[Equation 2]}$$

2. The thermoplastic resin composition according to claim 1, wherein the polymethylmethacrylate resin (B) has a weight average molecular weight of 50,000 to 150,000 g/mol.

3. The thermoplastic resin composition according to claim 1, wherein the graft copolymer (A) comprises 20 to 60% by weight of the alkyl acrylate rubber and 40 to 80% by weight of an aromatic vinyl compound-vinyl cyanide compound copolymer (a-2).

4. The thermoplastic resin composition according to claim 1, wherein the graft copolymer (A) has a grafting degree of 60% or more as calculated by Equation 3 below:

Grafting degree (%)=[Weight (g) of grafted monomers/Rubber weight (g)]×100,  [Equation 3]

wherein:

the weight (g) of the grafted monomers is obtained by subtracting the rubber weight (g) from a weight (g) of the gel, the gel is obtained by dissolving the graft copolymer (A) in acetone and performing centrifugation, and the rubber weight (g) is a weight (g) of rubber components added during polymerization.

5. The thermoplastic resin composition according to claim 1, further comprising one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent.

6. The thermoplastic resin composition according to claim 1, wherein the thermoplastic resin composition has a total light transmittance (Tt) of 75% or more as measured using a specimen having a thickness of 3T according to ASTM D1003.

7. The thermoplastic resin composition according to claim 1, wherein the thermoplastic resin composition has a haze of 11% or less as measured using a specimen having a thickness of 3T according to ASTM D1003.

8. The thermoplastic resin composition according to claim 1, wherein the thermoplastic resin composition has a gloss of 120 or more as measured at an angle of incidence of 45° according to ASTM D2457.

9. The thermoplastic resin composition according to claim 1, wherein:

the thermoplastic resin composition is in a form of an extruded film having dimensions of 0.15 mm×5 cm×5 cm in thickness, width, and length, and when a 1 kg weight is vertically dropped onto the extruded film from a height of 25 cm using a Gardner impact tester, haze values before and after impact are measured for a portion of the extruded film hit by the weight according to ASTM D1003, a difference in the haze values before and after the impact is calculated, and a haze difference is 10 or less.

10. A method of preparing a thermoplastic resin composition, comprising:

kneading and extruding, at 200 to 300° C. and 100 to 500 rpm, 35 to 85% by weight of an alkyl acrylate-aromatic vinyl compound-vinyl cyanide compound graft copolymer (A) containing alkyl acrylate rubber having an average particle diameter of 50 to 120 nm and 15 to 65% by weight of a polymethylmethacrylate resin (B), wherein the thermoplastic resin composition has an alkyl acrylate coverage value (X) of 70% or more as calculated by Equation 1 below:

$$X=\{(G-Y)/Y\}\times100,$$  [Equation 1]

wherein G represents a content (wt %) of a gel based on a total weight of the thermoplastic resin composition, and Y represents a content (wt %) of the alkyl acrylate in the gel based on the total weight of the thermoplastic resin composition, wherein the content of the gel is measured by a method that includes: adding 1 g of a thermoplastic resin composition to 30 g of acetone, followed by stirring at room temperature for 12 hours, then performing centrifugation to separate insoluble matter that is not dissolved in acetone, followed by drying for 12 hours, and measuring and calculating the content of the gel from by Equation 2:

Content of gel (%)=[Weight (g) of insoluble matter (gel)/Weight (g) of sample]×100.  [Equation 2]

11. A molded article, comprising the thermoplastic resin composition according to claim 1.

* * * * *